United States Patent [19]

Blackburn et al.

[11] Patent Number: 4,580,260

[45] Date of Patent: Apr. 1, 1986

[54] ANALOG SUBSCRIBER CARRIER SYSTEM TERMINAL WITH AUTOMATIC GAIN AND SLOPE CORRECTION

[75] Inventors: Tom L. Blackburn, San Jose, Calif.; David J. Farrell, Lafayette, Colo.

[73] Assignee: GTE Communication Systems Corporation, Phoenix, Ariz.

[21] Appl. No.: 606,803

[22] Filed: May 3, 1984

[51] Int. Cl.[4] .......................... H04J 1/02; H04B 3/38; H04B 3/58

[52] U.S. Cl. .................................. 370/74; 179/170 A

[58] Field of Search ....................... 370/74, 75, 26, 30, 370/121; 179/170 A

[56] References Cited

U.S. PATENT DOCUMENTS

| | | | |
|---|---|---|---|
| 2,300,415 | 11/1942 | Green | 179/170 A |
| 2,758,281 | 8/1956 | Carleson | 179/170 A |
| 4,087,639 | 5/1978 | Beene et al. | 370/74 |
| 4,136,267 | 1/1979 | Foster et al. | 179/170 A |
| 4,281,408 | 2/1981 | Bonnerot | 370/74 |

Primary Examiner—Douglas W. Olms
Assistant Examiner—Frank M. Scutch, III
Attorney, Agent, or Firm—Douglas M. Gilbert

[57] ABSTRACT

An FDM subscriber carrier system with two pilots located adjacent the upper and lower ends of the high frequency band uses the detected pilot levels at a remote terminal to adjust the gain and slope amplifiers in both directions of transmission. A microprocessor, programmed to identify the cable transmission characteristics, uses status signals derived from the two detected pilots to produce control signals to adjust and optimize the gain and slope settings of line amplifiers.

4 Claims, 6 Drawing Figures

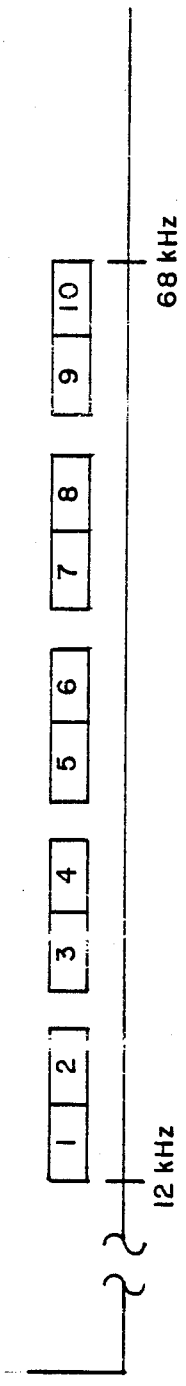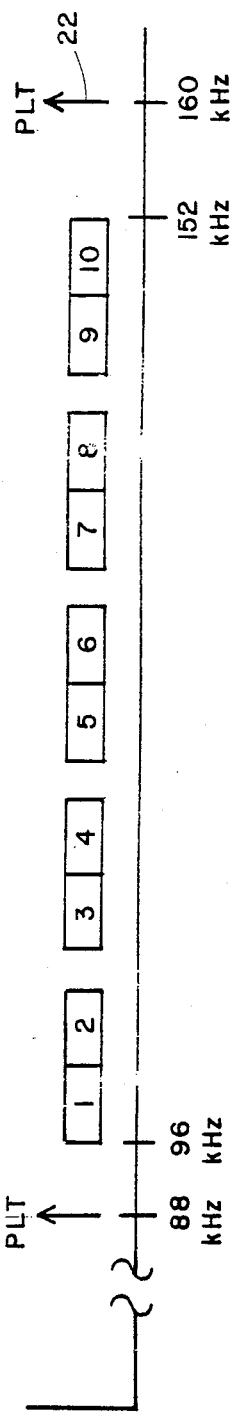

ANALOG SUBSCRIBER CARRIER SYSTEM TERMINAL WITH AUTOMATIC GAIN AND SLOPE CORRECTION

CROSS-REFERENCE TO RELATED APPLICATION

This application is related to application Ser. No. 565,568 filed Dec. 27, 1983, entitled "APPARATUS FOR CONTROLLING A PLURALITY OF CURRENT SOURCES" and also to application Ser. No. 606,804, filed May 3, 1984, entitled "AN ANALOG SUBSCRIBER CARRIER SYSTEM REPEATER WITH AUTOMATIC GAIN AND SLOPE CORRECTION."

BACKGROUND OF THE INVENTION

1. Field of the Invention

This invention relates to FDM (frequency division multiplexed) subscriber carrier systems used in telecommunications and, more particularly, to analog terminals which automatically adapt to various changes in cable characteristics. Further, the gain and slope correction for both directions of transmission are obtained by cross-regulation as the pilot signals are only transmitted in the high frequency band.

2. Background Description

The carrier modulation employed in analog carrier systems is typically double sideband (DSB-AM) or single sideband (SSB-AM). Single-sideband modulation occupies far less bandwidth than DSB-AM for the same number of channels, but it has the disadvantage of being more sensitive to changes in gain or attenuation versus frequency (i.e. slope) in the transmission path. Fixed equalizers have often been used to compensate for this (frequency roll-off) slope characteristic, and most are manually adjustable so that cable length variations in spacing between end terminals may be accommodated. In addition to the standard variation of attenuation with frequency, there are changes in the attenuation characteristics of insulated cables as a result of temperature and weather conditions. The latter is important in cable carrier systems, such as used in telephony subscriber loops, because of the effect of moisture on cable shunt conductance. Some means of automatic level regulation is necessary to maintain the transmission levels of such systems at or near the desired values for each SSB channel.

If the overall gain were the same for each frequency, (i.e., no slope) a variable gain amplifier would be sufficient to compensate for the gain variation. Unfortunately, the frequency slope of the commonly used transmission cables also changes with variations in ambient conditions. To compensate for variable slope requires that the slope equalization characteristic also be varied for the overall gain versus frequency characteristic to remain flat.

In many prior art carrier systems, two pilots, one near each edge of the transmission band, have been used in each direction of transmission to provide a basis for both gain and slope correction. In subscriber carrier systems a form of cross-regulation has been employed. Only two pilots are transmitted; both in the high frequency band. The high frequency band is normally transmitted from the central office to the subscriber station or end terminal. This results in a relatively simple gain and slope regulator for this direction of transmission. Usually a closed loop regulator in conjunction with a pilot pick off filter are all that are necessary. The gain is adjusted until the low frequency pilot matches a predetermined level, and then the slope is varied until both pilots are at the same level.

For the return path (subscriber station to central office) the frequency band is pre-equalized. The amount of gain and slope correction that is needed must be based upon the level of the incoming (high frequency path) pilots. With minor variations the gain and slope settings are often adjusted to the same values as those in the other direction. Such an adjustment is a compromise and thus errors are introduced. Some of these errors may be manually adjusted during initial alignment using switched equalizer networks which are included for this purpose. However, the accuracy of regulation is poor particularly when changes in temperature are considered. The frequency response should be flat to within ±0.25 dB for each channel for cable losses of 35 dB ±5 dB and for cable gauges of 19, 22, 24 and 26 which are operating in ambient temperature conditions of from −40° C. to +65° C. Further, no manual adjustment should be necessary. It is an object of this invention to provide a subscriber carrier system having improved gain stability over a wide range of ambient temperatures.

Prior art carrier systems also have the disadvantage that if one or both system pilots fail, the gain and slope amplifier settings often are increased to the maximum possible levels which usually interrupts transmission. It is a further object of this invention to provide a subscriber carrier system where the gain and slope amplifier settings are stored in memory, so that system pilot failures will not result in an interruption of transmission.

SUMMARY OF THE INVENTION

An analog subscriber carrier duplex remote terminal is disclosed with two amplifiers in each transmission path. A gain amplifier sets the levels to a predetermined value, and a slope amplifier corrects for undesirable frequency slope. Because there are only two system pilots and both are communicated in only one direction, the gain and slope settings of the return direction are accurately determined by an encoder which optimizes the proper level settings by using theoretical and empirical transmission characteristics which are stored or coded in the encoder. In the preferred embodiment the encoder is an 8-bit microprocessor that calculates the proper level settings from the detected pilots.

BRIEF DESCRIPTION OF THE DRAWING

FIG. 2A is a frequency allocation diagram showing the channel positioning for the low frequency (remote terminal to central office) direction of transmission;

FIG. 2B is a frequency allocation diagram showing the channel positioning for the high frequency (central office to remote terminal) direction of transmission.

DETAILED DESCRIPTION OF THE INVENTION

Figure 1:
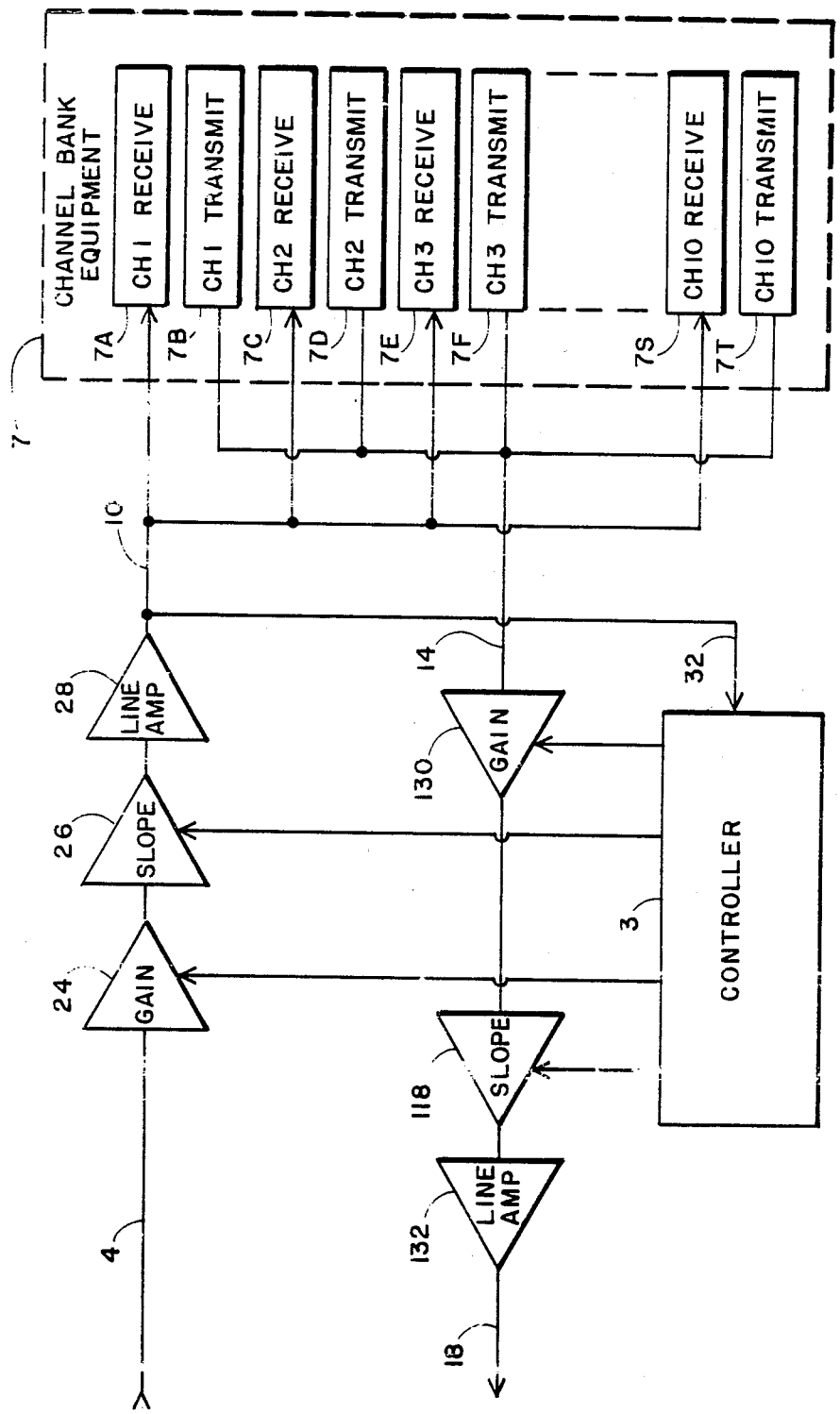
FIG. 1 is a block diagram illustrating the basic elements of a subscriber carrier remote terminal.

As was discussed earlier, in FDM subscriber carrier systems, two frequency bands are used to carry the multiplexed channels: one upper band (88 kHz–160 kHz) and one lower band (12 kHz–68 kHz), such as shown in FIG. 2. The upper band is usually used in the central office to remote terminal direction, and the lower band in the reverse direction. The upper band could include ten channels with a channel spacing as shown in FIG. 2B plus the low frequency pilot 20 as well as the high frequency pilot 22. A remote terminal, shown generally in FIG. 1, accepts the high frequency band channels and the two pilots and adjusts the gain and slope equalization amplifiers 24 and 26 so as to provide an output signal at the proper levels for transmission along path 10 to a channel bank 7. The received FDM channel signals on output path 10 are fed to the individual receiver channel units, shown generally as 7A, 7C, 7E, and 7S, which are all connected to the same path 10. Channel filters (not shown) would pick off the appropriate signals associated with a particular channel for further demodulation and processing to forward them to subscriber drops.

In the return or transmit direction, the individual channel signals are processed and stacked in the lower frequency band for transmission to the central office. Each of the transmit channel units (7B, 7D, 7F, and 7T) are bridged onto path 14. At this point the transmit signals must be pre-equalized, by gain and slope networks or amplifiers 130 and 118. Because the pilots are transmitted in only one direction of transmission, a cross-regulation is employed to provide the approximate gain and slope equalization condition for amplifiers 118 and 130. If the prediction for the pre-equalization at the terminal is correct, the level at the output of each carrier channel will be substantially the same and will be very close to the standard level desired. As noted hereinabove the cross-regulation employed in prior art carrier systems is a compromise and does not always provide the appropriate pre-equalization condition. One arrangement by which the predicted pre-equalization condition closely approximates the desired value is shown in FIG. 3.

Figure 3:
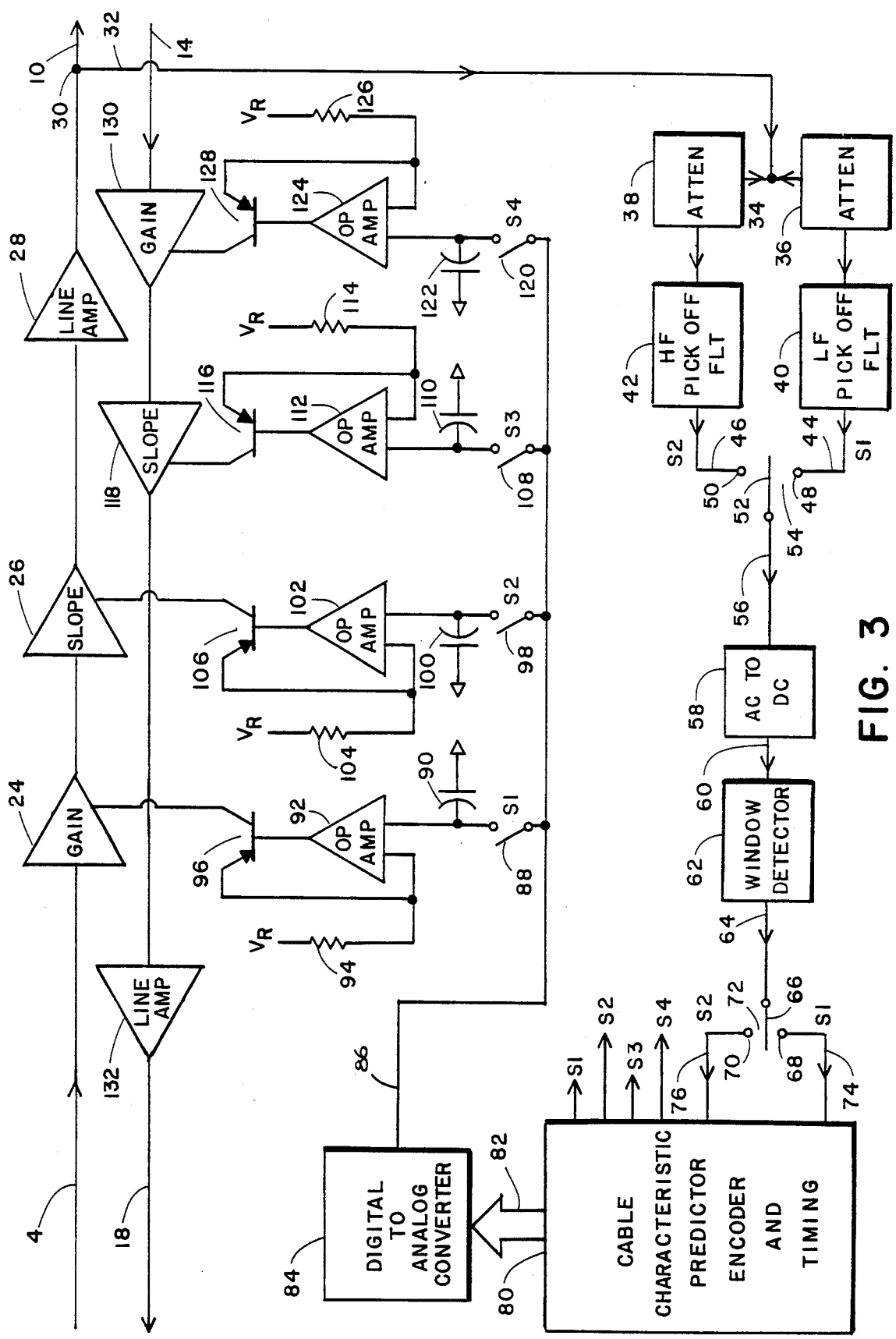
FIG. 3 is a block diagram of a remote terminal in a subscriber carrier system which employs an embodiment of the instant invention.

Referring now to FIG. 3 it may be seen that the input and output paths are numbered in accordance with FIG. 1. This was done to provide a basis for orientation of FIG. 3 with the overall subscriber carrier system. It is to be understood that the manner in which the cross-regulation is derived in order to provide a very precise prediction for the pre-equalization is quite different from that employed in prior art systems. The high frequency channels including the pilots 20 and 22 are applied to the input of gain amplifier 24, then to slope correction amplifier 26, then to line amplifier 28 and then via junction 30 to output path 10. At junction 30 the corrected line signals are applied via path 32 and junction 34 to the inputs of attenuators 36 and 38, respectively. The attenuator 36 is selected to provide a predetermined amplitude at the output of the low frequency pick off filter 40 when the low frequency pilot is at the proper level at output 10. Similarly the attenuation of attenuator 38 is selected so as to provide the same predetermined amplitude for the high frequency pilot which appears at the output of the high frequency pick off filter 42 when this pilot is at the proper level at output 10. The low frequency and high frequency pilots are applied via paths 44 and 46, respectively, to contacts 48 and 50 of switch 54. The wiper arm 52 of switch 54 is connected to contact 48 by the S1 pulse and to contact 50 by the S2 pulse (shown in FIG. 5). Thus the low frequency and high frequency pilot signals are applied alternately to the AC to DC converter 58 which changes the AC signals into DC amplitudes that appear alternately on path 60. The DC amplitude for each of the two signals would be the same, or very nearly so where the gain and slope correction provided by gain amp 24 and slope amp 26 provides complete correction for the variations in transmission characteristics. A window detector 62 recognizes four DC amplitude conditions. First are those amplitudes below a threshold level. Second are those amplitudes within the "window" between the low threshold level and the high threshold level. (Those levels which appear within the window indicate an area of normal operation, i.e., no change.) Third there are those amplitude levels that are above the high threshold level. And lastly there is a zero amplitude condition, i.e., no pilots at all. (The adjustment range of the repeater covers a ±5 dB range about 35 dB of line loss. A DC reference point is set in the window detector corresponding to greater than 40 dB of line loss. By definition the terminal equipment cannot adjust for such a loss, therefore, the window detector issues a "no pilots present" indication to the microprocessor.)

The window detector, in order to accommodate the four different DC amplitude conditions, uses a two digit binary coded output signal.

| Bit 1 | Bit 2 | Status |
|---|---|---|
| 1 | 1 | Within window |
| 1 | 0 | Above window |
| 0 | 1 | Below window |
| 0 | 0 | No pilots |

Thus in the preferred embodiment of the invention, window detector 62 converts the amplitude of the DC signal on path 60 into a binary coded signal on path 64 which is applied via wiper contact 66 of switch 72 to either contact 68 or 70. The timing of the connection of the wiper contact 66 to either contact 68 or 70 is such as to put the binary code on path 74 for the low frequency pilot and on path 76 for the high frequency pilot. These two binary coded signals represent the status of the low frequency and high frequency pilots following gain and slope correction.

As will be explained in more detail the cable characteristic predictor encoder and timing circuit 80 use the pilot status signals on paths 74 and 76 to identify the cable characteristics of the transmission path and to predict the low frequency response needed to set the gain and slope amplifiers in the station to central office path.

Figure 5:
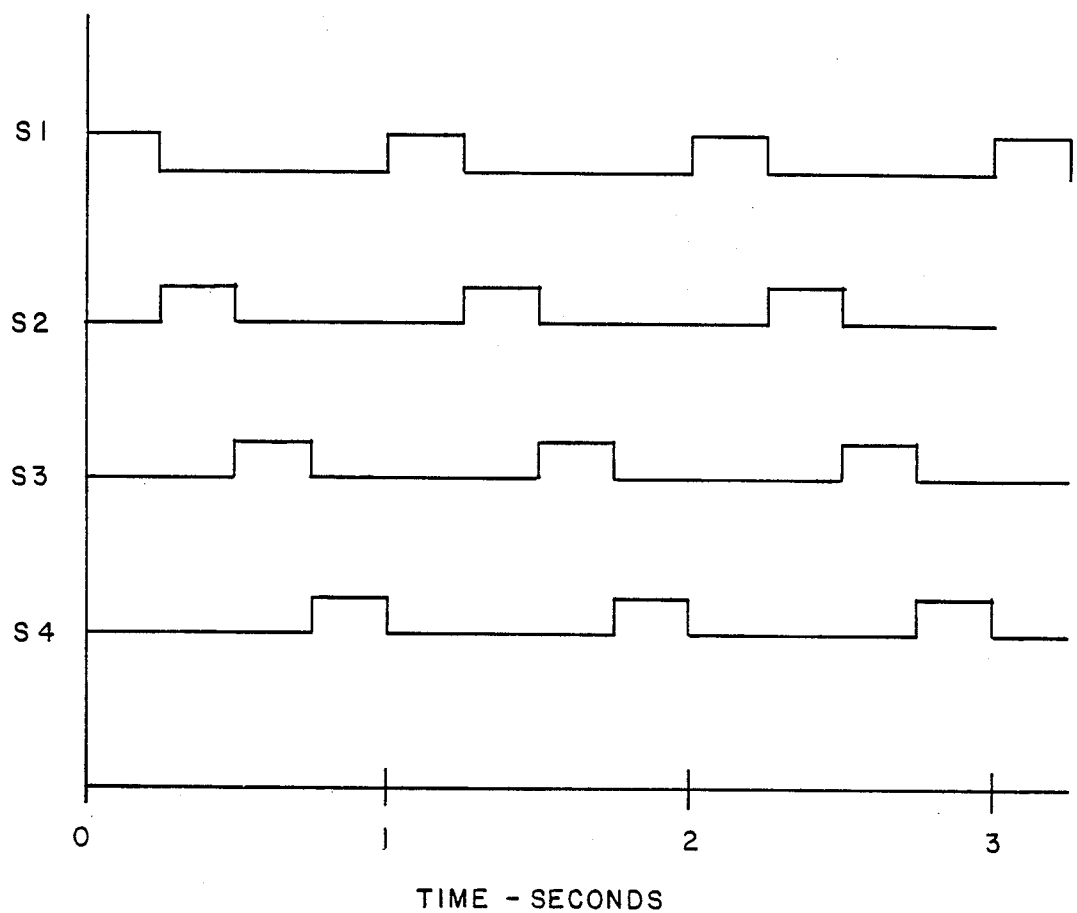
FIG. 5 is a timing diagram which illustrates the timing sequence for the switches (S1), (S2), (S3) and (S4) of FIGS. 3 and 4.

In accordance with the timing diagram shown in FIG. 5, four digital words (of 8-parallel bits) appear in sequence on path 82 and are applied to digital to analog converter 84 and then along path 86 to switches 88, 98, 108 and 120. (However, it should be noted that the last two digital words used to correct the low frequency amplifier settings, remain fixed at their initial setting until the high group amplifiers 24 and 26 have completed their correction.) The first correction signal appearing on path 82 is directed as a control signal to switch contact 88. Switch 88 is closed during the pulse period in question, and the control signal is applied as a DC voltage to storage capacitor 90 and also to the input of operational amplifier 92. A reference voltage is applied via resistor 94 to the other input of operational amplifier 92 and to the emitter of current source 96. The periodic closing of switch 88 refreshes storage capacitor 90 and thus maintains the value of the control voltage from one sample period to the next. The control voltage is applied to current source 96 to control the gain of amplifier 24. Similarly the next control voltage signal is applied to slope amplifier 26. During the S2 pulse period, the control voltage from digital to analog converter 84 is applied via switch 98 to the input of operational amplifier 102 as well as to the storage capacitor 100. A reference voltage is applied via resistor 104 to the other input of operational amplifier 102 and to the emitter of current source 106. The collector of current source 106 is applied to the slope amplifier 26 in order to provide appropriate correction for the gain v. frequency characteristic. One way in which the gain (attenuation) with frequency may be adjusted is to vary the Q of the network in the amplifier circuit as is well known.

As was noted hereinabove the correction for the high frequency direction can be relatively easily accomplished. An improved result is obtained by the use of separate switched circuits and the storage of the adjustment information which will maintain the setting of the gain amplifier 24 and the slope amplifier 26 at acceptable levels even though the pilot frequencies may be interrupted for a short period of time.

For the low frequency direction of transmission, gain and slope correction is provided in a manner similar to that disclosed for the high frequency direction of transmission. However instead of simply setting the gain and slope of amplifiers 130 and 118 to be the same as the amplifier settings of the other direction, a more complex and very accurate technique is used. In order to arrive at more precise gain and slope settings, it was necessary to emulate (first theoretically then empirically) the transmission characteristics of various cables over a range of temperature variations.

For cables of 22, 24 and 26 gauge the following network formula was used as the amplitude response function $$\left(\frac{S + \omega_z}{S + \omega_c}\right)\left(\frac{S}{S + \omega_1}\right) = G(S) \tag{1}$$

where
$\omega_1 = (2\pi)$ 12 kHz
S = angular frequency variable (j$\omega$)
$\omega_c = (2\pi)$ 125 kHz and
$\omega_z = (2\pi)f_z$ where $f_z$ is the zero frequency of the cable response function G(S).

And for 19 gauge cable the network equation is as follows:

$$\left(\frac{S + \omega_z}{S + \omega_c}\right)\left(\frac{S}{S + \omega_1}\right)\left(\frac{\omega_o^2}{S + S\frac{\omega_o^2}{Q} + \omega_o^2}\right) = G(S) \tag{2}$$

where
$\omega_c = (2\pi)$ 8 kHz
$\omega_o = (2\pi)$ 100 kHz
$\omega_1 = (2\pi)$ 125 kHz Q = 2.0 and
$\omega_z = (2\pi)f_z$.

Using the information thus derived along with the measured slope versus $\omega_z$, the following equations were developed. In the preferred embodiment of the invention these were used in the programming of a microprocessor and thus provided the cable characteristic predictor encoder as shown in block 80 of FIG. 3.

$$\log_{10}(CGH) = 3.4 - 0.94\log_{10}(GH) \tag{4}$$

$$\log_{10}(CSH) = 2.7 - 2.56\log_{10}(SH) \tag{5}$$

$$CSL = A\log_2(85/256 + \log_2(CGH)) - A\log_2(\log_2(CSH) - 241/256) + 12 \tag{6}$$

$$CGL = A\log_2(12 + 163/256 - \log_2(CGH)) \tag{7}$$

where
CGH = high group gain microprocessor code
CSH = high group slope microprocessor code
CSL = low group slope microprocessor code
CGL = low group gain microprocessor code and
Alog = "anti" or inverse logarithm.

As may be seen from equations 4 and 5 above, the high group gain microprocessor code is solely a function of high group gain setting GH (which is derived from the low frequency pilot), and the high group slope microprocessor code is solely a function of high group slope setting SH (which is derived from the high frequency pilot). Using the high group gain microprocessor code CGH and the high group slope microprocessor codes CSH, the low group slope microprocessor code and the low group gain microprocessor code are derived. Thus the required values for the low frequency gain and slope are obtained solely from the two system pilots received in the high frequency direction.

Operationally at the time the system initially sets the amplifier gains, the microprocessor issues a set of commands to the four current sources 96, 106, 116, and 128. Each presets all the line amplifiers to some nominal level (35 dB of gain with 6 dB of slope over 88-160 kHz). Then the pilot levels are examined so that the proper high group gain and slope settings (CGH and CSH) can be determined. If the pilot levels are too high the microprocessor changes the coded current setting to reduce the high group gain setting of amp 24. Once the detected pilot levels are in the proper "window," the microprocessor sets the high group slope (CSH) at output 82 by varying the slope and comparing the detected pilot levels. Once the two pilots are within a predetermined amplitude of each other, the microprocessor maintains that current drain to the high group amplifiers. So in the high group direction there is no involved computation of levels or values for the determination of the gain and slope settings.

Once GH and SH are determined the digital microprocessor codes for the high group gains and slope settings (CGH and CSH, respectively) are stored in the microprocessor. The microprocessor then computes the required values for CSL and CGL from the equations (6) and (7), which are simply functions of CGH and CSH. Alternatively it would also be possible to use two ROM devices, read only memories, (with 256×256 cells for 8-bit CGH/CSH words) to store all possible combinations of CGH and CSH versus CSL and CGL. With two such "tables" (one for each low group variable), the problem of calculation reduces to a simple "look up" function. However, for reasons of economics the microprocessor is often the better alternative to two ROM devices to implement this function.

Figure 4:
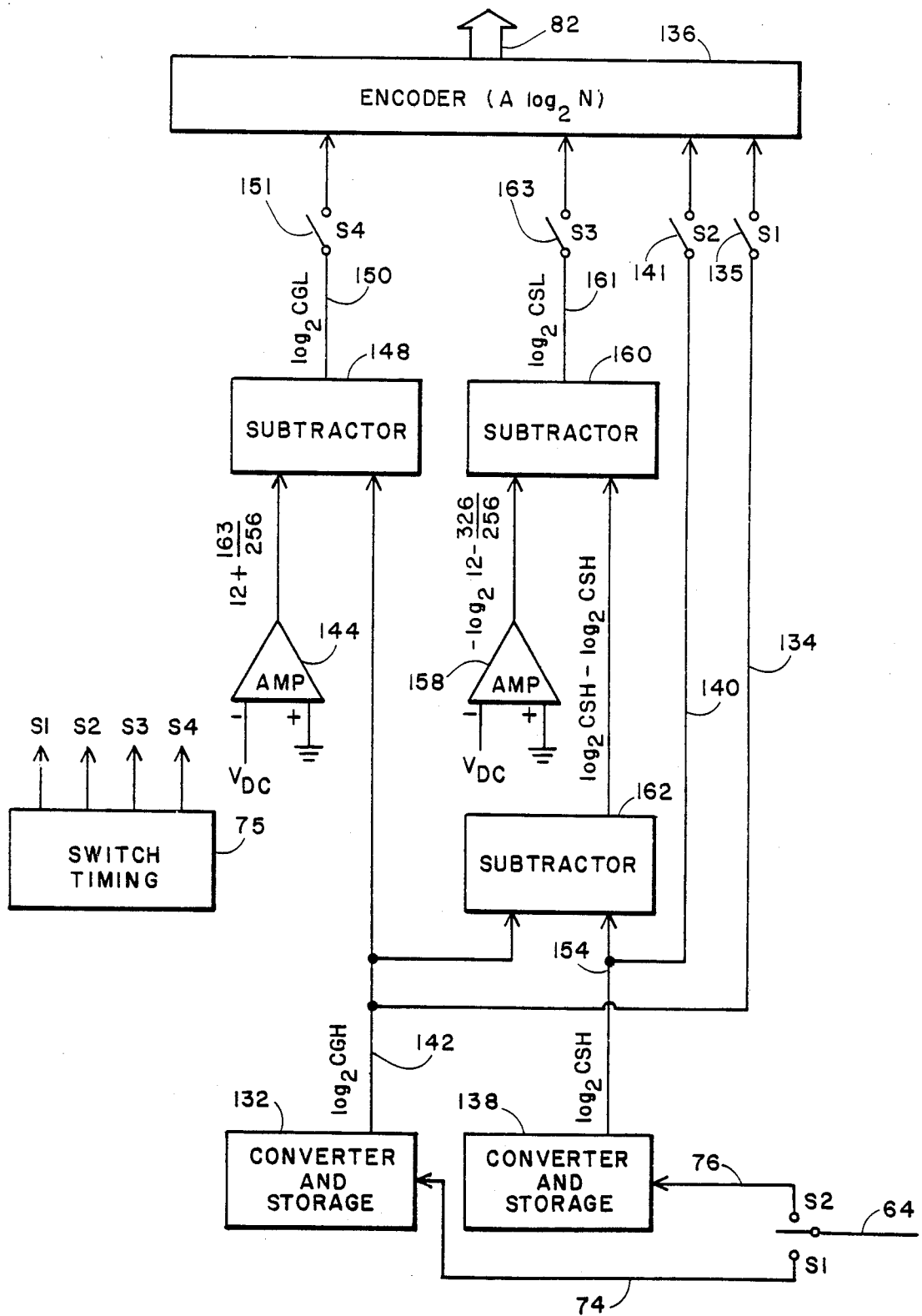
FIG. 4 is a block diagram which illustrates one technique by which the cable characteristic predictor encoder and timing (80) may be effectuated.

Another way in which the information obtained by equations 4, 5, 6 and 7 may be used to derive the predictions for the low frequency group gain and slope is shown in FIG. 4. In place of the microprocessor, a discrete circuit could be implemented to perform the "calculations" of equations 4, 5, 6, and 7. To make the explanation clearer, these four equations may be expressed differently by converting to the same log base 2 and taking the antilog of equations 4 and 5. (Note $\log_2 N \cong 3.32 \log_{10} N$).

$$CGH = A\log(11.3 - 0.94\log(GH)) \quad (4a)$$

$$CSH = A\log(9 - 2.56\log(SH)) \quad (5a)$$

$$CSL = A\log(85/256 + \log(CGH)) - A\log(-\log(CSH) - 241/256) + 12 \quad (6a)$$

$$CGL = A\log(12 + 163/256 - \log(CGH)) \quad (7a)$$

By rearranging terms these equations can be rewritten as follows.

$$\log(CGH) = 11.3 - 0.94\log(GH) \quad (4b)$$

$$\log(CSH) = 9 - 2.56\log(SH) \quad (5b)$$

$$\log(CSH) = \log(CGH) - \log(CSH) = \log 12 + 326/256 \quad (6b)$$

$$\log(CGL) = 12 + 163/256 - \log(CGH) \quad (7b)$$

The numerical constants, 11.3, 9, etc. may be implemented as simply DC voltages as shown in FIG. 4. Similarly the subtraction of terms may be performed by differential amplifiers (148, 160, and 162). The encoder 136 performs the antilog function ($A\log_2 N$) to obtain the required 8-bit word which goes to the D/A converter 84. And, the Converter and Storage units 132 and 138, convert the two bit codes from the window detector to a DC voltage. The code for the high frequency pilot is applied via path 76 to the input of converter and storage 138 and thence via path 140 to switch 141 at pulse time S2 to encoder 136 where it is converted into a binary code and sent as a parallel byte along path 82. Thus the control of the gain and slope of the high frequency path is effected as is described in FIG. 3. To derive the low frequency gain and slope settings, the equations 6b and 7b are solved for log(CSL) and log(CGL). By following the input signals through to the subtractor circuit 148, it can be seen that the signal on path 150 represents log(CGL). And switch 152 closes in the appropriate time interval to apply log(CGL) to the encoder 136 which extracts the desired code for the low frequency gain setting. Similarly the code for the low frequency slope setting is derived through the two subtractors 160 and 162, switch 163, and encoder 136.

As noted hereinabove the use of the storage capacitors 90, 100, 110 and 122 as shown in FIG. 3 provide the control signal during the time when the associated switch is open. When the pilots fail, the microprocessor just continues to recharge the capacitors (refresh) whenever the associated switch is open in order to hold the output signals constant. Unfortunately in the discrete version just described, if a loss of pilot occurs the capacitors controlling the current sources will not be refreshed, and therefore, the amplifiers will seek a maximum gain setting.

What is claimed is:

1. In a duplex communication system between a remote station and an associated station having first and second transmission paths with two system pilots communicated in the first transmission path and no system pilots communicated in the second transmission path, apparatus at a remote station that automatically adjusts for gain and slope equalization in both transmission paths comprising:

first network means having a first output and first and second control inputs, said first control input for controlling the gain of said first network means and said second control input for controlling the slope equalization of said first network means, said first network means operatively connected in said first transmission path and providing at said first output amplified system pilots;

second network means having third and fourth control inputs, said third control input for controlling the gain of said second network means and said fourth control input for controlling the slope equalization of said second network means, said second network means operatively connected in said second transmission path;

detector means connected to said first output and providing coded output signals indicative of the amplitude of said amplified system pilots relative to a predetermined level;

encoder means responsive to said coded output signals and providing first and second status signals to said first and second control inputs, respectively, said first status signal controlling the gain of said first network means and said second status signal controlling the slope of said first network means, said encoder means also providing third and fourth status signals to said third and fourth control inputs, said third status signal controlling the gain of said second network means, and said fourth status signal controlling the slope of said second network means, said third and fourth status signals being functionally related to predicted transmission characteristics of said second transmission path such that said second network means automatically maintains the gain and slope equalization of said second transmission path.

2. Apparatus as in claim 1 wherein said first and second network means comprises:

first gain amplifier means having said first control input for controlling the gain of said first gain amplifier means;

first slope amplifier means having said second control input for controlling the slope of said first slope amplifier means, said first slope amplifier means operatively connected in series with said first gain amplifier means, and providing at said first output said amplified system pilots;

second gain amplifier means having said third control input for controlling the gain of said second gain amplifier means; and second slope control amplifier means having a fourth control input for controlling the slope of said second slope control amplifier means, said second slope control amplifier means operatively connected in series with said second gain amplifier means.

3. Apparatus as in claim 2 wherein said encoder means further comprises:

current source means operatively connected to said first, second, third, and fourth control inputs, said current source means selectively applying a control current to each of said first gain and slope amplifier means and second gain and slope amplifier means and thereby setting the respective gain and slope of said amplifier means;

digital to analog converter means operatively connected to said current source means for applying to said current source means a time division multiplexed analog signal proportional to the level of control current to be applied to each of said first gain and slope amplifier means and second gain and slope amplifier means;

microprocessor means having first and second inputs and a digital output, said digital output operatively connected to said digital to analog converter means, said microprocessor generating at its output a time multiplexed digital signal; and first switch means having an input and first and second outputs connected, respectively, to said first and second inputs of said microprocessor means, said first switch means receiving at its input said detector means output signals and alternately switching said output signals from one output to the other.

4. A remote terminal, in a subscriber carrier duplex transmission system having two system pilots transmitted in a first transmission path and no system pilots communicated in the second transmission path, that automatically adjusts the levels and slope equalization in both first and second transmission paths, said remote terminal comprising:

first amplifier means operatively connected in said first transmission path to provide signal gain, said first amplifier means having a first control input for controlling the gain thereof;

first slope equalization means operatively connected in series with said first amplifier means to provide an adjustment of the frequency slope of said first transmission path, said equalization means having an output and a second control input for controlling the frequency slope thereof so that the two system pilots may be set to substantially the same level at the output thereof;

second amplifier means operatively connected in said second transmission path to provide signal gain, said second amplifier means having a third control input for controlling the gain thereof;

second slope equalization means operatively connected in series with said second amplifier means to provide an adjustment of the frequency slope of said second transmission path, said second equalization means having a fourth control input for controlling the frequency slope thereof;

pilot detection means operatively connected to said first slope equalization means output for detecting the amplitudes of said system pilots and providing coded status signals indicative of said amplitudes;

encoder means responsive to said coded status signals and providing first and second status signals to said first and second control inputs, respectively, such that said pilot levels at said first slope equalization means output are substantially the same and are at a predetermined level, said encoder also providing third and fourth status signals, respectively, to said third and fourth control inputs, said third and fourth status signals being functionally related to predicted transmission characteristics of said second transmission path and thereby controlling the gain and slope at said remote terminal to pre-equalize said second transmission path so that signal transmission from said remote terminal communicating station over said second transmission path will be substantially independent of changes in environmental conditions.

* * * * *